US009128680B2

(12) United States Patent
Chi et al.

(10) Patent No.: US 9,128,680 B2
(45) Date of Patent: Sep. 8, 2015

(54) CASING STRUCTURE AND ELECTRONIC DEVICE USING THE SAME

(71) Applicant: Cal-Comp Electronics & Communications Company Limited, New Taipei (TW)

(72) Inventors: Min-Chang Chi, New Taipei (TW); Tung-Kai Tsai, New Taipei (TW)

(73) Assignee: Cal-Comp Electronics & Communications Company Limited, New Taipei (TW)

( * ) Notice: Subject to any disclaimer, the term of this patent is extended or adjusted under 35 U.S.C. 154(b) by 94 days.

(21) Appl. No.: 14/160,573

(22) Filed: Jan. 22, 2014

(65) Prior Publication Data

US 2015/0003006 A1    Jan. 1, 2015

Related U.S. Application Data

(60) Provisional application No. 61/839,880, filed on Jun. 27, 2013.

(30) Foreign Application Priority Data

Oct. 11, 2013    (TW) .............................. 102136816 A (51) Int. Cl.
*G06F 1/16*   (2006.01)
*G06F 1/18*   (2006.01)

(52) U.S. Cl.
CPC ...................................... *G06F 1/187* (2013.01)

(58) Field of Classification Search
CPC ........................................................ G06F 1/187
See application file for complete search history.

(56) References Cited

U.S. PATENT DOCUMENTS

| 5,145,389 | A | 9/1992 | Okubo | |
|---|---|---|---|---|
| 7,102,885 | B2 * | 9/2006 | Chen et al. | 361/679.31 |
| 7,715,185 | B2 * | 5/2010 | Zhang et al. | 361/679.37 |
| 7,760,495 | B2 * | 7/2010 | Li | 361/679.37 |
| 7,911,777 | B2 * | 3/2011 | Fan et al. | 361/679.36 |
| 8,054,621 | B2 * | 11/2011 | Chang | 361/679.37 |
| 8,072,745 | B2 * | 12/2011 | Chen et al. | 361/679.33 |
| 8,089,752 | B2 * | 1/2012 | Xu et al. | 361/679.33 |
| 8,705,230 | B2 * | 4/2014 | Wen | 361/679.38 |
| 9,058,151 | B2 * | 6/2015 | Chou | 1/1 |
| 2014/0345105 | A1 * | 11/2014 | Brockett | 29/428 |

FOREIGN PATENT DOCUMENTS

TW    M327051    2/2008
TW    I340008    4/2011

* cited by examiner

*Primary Examiner* — Lisa Lea Edmonds
(74) *Attorney, Agent, or Firm* — Jianq Chyun IP Office (57) ABSTRACT

A casing structure including a frame having a capacity space and a fastener at a side of the capacity space that an electronic unit assembled therein, a first linking member slidably coupled to the frame, and a second linking member pivoted to the frame having a first and a second end is provided. The first end is linked to the first linking member and the second end faces to the electronic unit in the space. The electronic unit is locked by the fastener in assembling mode and the first linking member is located at a first position to block the fastener from releasing the electronic unit. The first linking member is forced to move out of the first position and drive the second linking member to rotate relative to the frame, such that the second end pushes the electronic unit to be released from the fastener in disassembling mode.

20 Claims, 10 Drawing Sheets

CASING STRUCTURE AND ELECTRONIC DEVICE USING THE SAME

CROSS-REFERENCE TO RELATED APPLICATION

This application claims the priority benefits of U.S. provisional application Ser. No. 61/839,880, filed on Jun. 27, 2013 and Taiwan application serial no. 102136816, filed on Oct. 11, 2013. The entirety of each of the above-mentioned patent applications is hereby incorporated by reference herein and made a part of this specification.

BACKGROUND OF THE INVENTION

1. Field of the Invention

The invention relates to a casing structure, and more particularly, to a casing structure of an electronic device.

2. Description of Related Art

In present days, a removable electronic unit such as a removable power supply, a removable hard disk or a removable fan has been widely applied in systems including a network attached storage, an industry computer, a server, a disk array or a communication apparatus, so as to provide a sufficient and constant power or a data storage capacity which may be easily managed. The removable electronic unit is also removable based on demands in usages, so as to facilitate a user in replacement, expansion or maintenance.

However, the removable electronic unit nowadays is usually fixed in a casing structure by using screws. In case the replacement is required, the screws need to be removed before the electronic unit may be fetched, and the screws may only be fixed back on after the replacement is completed. Accordingly, besides that a time required for the expansion and the maintenance may be increased, members such as the screws are prone to loss or damage when not in use or during installation or disassembling process. Therefore, there is still rooms for improving a fixing method that fixes the removable electronic unit with the casing structure. In view of above, the invention is intended to provide a casing structure and an electronic unit which are easy to install and disassemble.

SUMMARY OF THE INVENTION

The exemplary embodiment is directed to a casing structure and an electronic device using the same, in which a simple member disposition is provided for a user to easily assemble/disassemble electronic units therein.

The exemplary embodiment provides a casing structure and an electronic device using the same, in which members of a casing does not need to be removed during a process of installing and disassembling the electronic device.

The casing structure of an exemplary embodiment is adapted to detachably assembled and disposed with at least one electronic device therein. The casing structure includes a frame, a first linking member and a second linking member. The frame has a capacity space and an elastic fastener at a side of the capacity space. An electronic unit is adapted to be detachably assembled in the capacity space. The first linking member is slidably coupled to the side of the frame. The second linking member is pivoted to the frame. The second linking member has a first end and a second end opposite to each other. The first end is linked to the first linking member, and the second end faces the electronic unit located in the capacity space. The electronic unit located in the capacity space is locked by the elastic fastener in an assembling mode and the first linking member is located at a first position to block the elastic fastener for preventing the elastic fastener from releasing the electronic unit thereby fixing the electronic unit to the frame. After the first linking member is forced by a force parallel to a first direction extended from the first linking member to slide relative to the frame to move out the first position, the first linking member drives the second linking member to rotate relative to the frame, such that the second end of the second linking member pushes the electronic unit to be released from the elastic fastener, and electrically disconnected from the control unit in a disassembling mode.

An electronic device of an exemplary embodiment includes said casing structure, a control unit and at least one electronic unit. The casing structure includes a frame, a first linking member and a second linking member. The frame has a capacity space and an elastic fastener at a side of the capacity space. The first linking member is slidably coupled to the side of the frame. The second linking member is pivoted to the frame. The second linking member has a first end and a second end opposite to each other. The first end is linked to the first linking member. The control unit is disposed in the capacity space. The electronic unit is detachably assembled in the capacity space, and the second end faces the electronic unit located in the capacity space. The electronic unit located in the capacity space is locked by the elastic fastener in an assembling mode and the first linking member is located at a first position to block the elastic fastener for preventing the elastic fastener from releasing the electronic unit thereby fixing the electronic unit to the frame and electrically connecting the electronic unit to the control unit. After the first linking member is forced to slide and move out the first position, the first linking member drives the second linking member to rotate relative to the frame, such that the second end of the second linking member pushes the electronic unit to be released from the elastic fastener, and electrically disconnected from the control unit in a disassembling mode.

In an exemplary embodiment, when the first linking member moves from the first position to a second position, the second end moves from a place away from the electronic unit to approach and contact the electronic unit. When the first linking member slides from the second position to be far away from the first position, the second end pushes the electronic unit in the disassembling mode.

In an exemplary embodiment, when the first linking member moves from the first position to a second position, the second end moves from a place away from the electronic unit to approach and contact the electronic unit. When the electronic unit is converted from the disassembling mode into the assembling mode, the electronic unit pushes the second end to rotate the second linking member so the second linking member presses the first linking member to move from the second position back to the first position.

In an exemplary embodiment, when the first linking member moves from the first position to a second position, the second end moves from a place away from the electronic unit to approach and contact the electronic unit. The frame further includes an elastic driving member located at the side and having a reverse bending portion with a recess facing towards the first linking member, and the first linking member includes a rod and a driver extended from the rod. The elastic driving member is located on a movement path of the driver. When the first linking member is located at the second position, the elastic driving member pushes the driver to move the first linking member back to the first position.

In an exemplary embodiment, the elastic driving member is an elastic piece structure being bent, and includes a reverse bending portion having a recess facing towards the first linking member. When the first linking member is located at the second position, the driver is pressed on the elastic piece structure so the driver is pushed by an elastic restoring force of the elastic piece structure to drive the first linking member to move to the first position.

In an exemplary embodiment, when the electronic unit is in the disassembling mode, the first linking member is located at a third position, and the reverse bending portion is located between the second position of the first linking member and the third position of the first linking member.

In an exemplary embodiment, the first linking member has a rod and a stopper extended from the rod. The elastic fastener is located on a movement path of the stopper. When the electronic unit is in the assembling mode and the first linking member is located at the first position, the elastic fastener is prop against between the electronic unit and the stopper.

In an exemplary embodiment, the electronic unit includes at least one locking hole, and the elastic fastener includes a protrusion. When the electronic unit is in the assembling mode, the protrusion is locked in the locking hole to provide a resistance which resists from exiting the assembling mode, and is configured to prevent variations to the assembling mode due to unexpected stress.

In an exemplary embodiment, the electronic unit includes a first locking hole and a plurality of second locking holes arranged along a movement path of the electronic unit in the casing structure. The elastic fastener includes a protrusion located on the movement path of the electronic unit. When the electronic unit moves along the movement path of the electronic unit to be converted from the disassembling mode into the assembling mode, the protrusion is locked in the second locking holes in sequence. When the first linking member is not moved to the first position, the protrusion is pseudo-locked in the second locking holes, respectively. When the first linking member is moved to the first position, the protrusion is locked in the first locking hole and the stopper blocks the protrusion from moving out the first locking hole.

In an exemplary embodiment, the electronic device is a hard disk.

Based on above, in the foregoing embodiments, a simple structural combination between the first linking member, the second linking member and the frame in the casing structure may form the linkage by connecting the first linking member with the second linking member, so as to serve as a power source and an attaching structure driven for disassembling/disassembling the electronic unit to the frame. Therein, when the electronic unit is moved in and assembled to the frame, the frame locks the electronic unit by using an elastic fastener at one side, and uses the first linking member located on the same side as a stopper structure of the elastic fastener, so as prevent the electronic unit being released from the elastic fastener, and electrically connect the electronic unit assembled to the frame to the control unit in the frame.

Moreover, when it comes to disassemble the electronic unit, by driving the first linking member to slide on the side, said block effect is released so that the electronic unit is released from the elastic fastener, and the electronic unit may also be driven by the linkage to be electrically disconnected from the control unit. As a result, in the casing structure of the exemplary embodiments, besides that the electronic unit may be ensured to be securely assembled outside the frame by using the linking member, the frame, and the members at the lateral side, both a locking relation between the elastic fastener of the frame and the electronic unit and a coupling relation between the electronic unit and the control unit may be released in one single movement of the first linking member, so as to accomplish the effect of assembling/disassembling the electronic device easily.

To make the above features and advantages of the disclosure more comprehensible, several embodiments accompanied with drawings are described in detail as follows.

DESCRIPTION OF THE EMBODIMENTS

Figure 1:
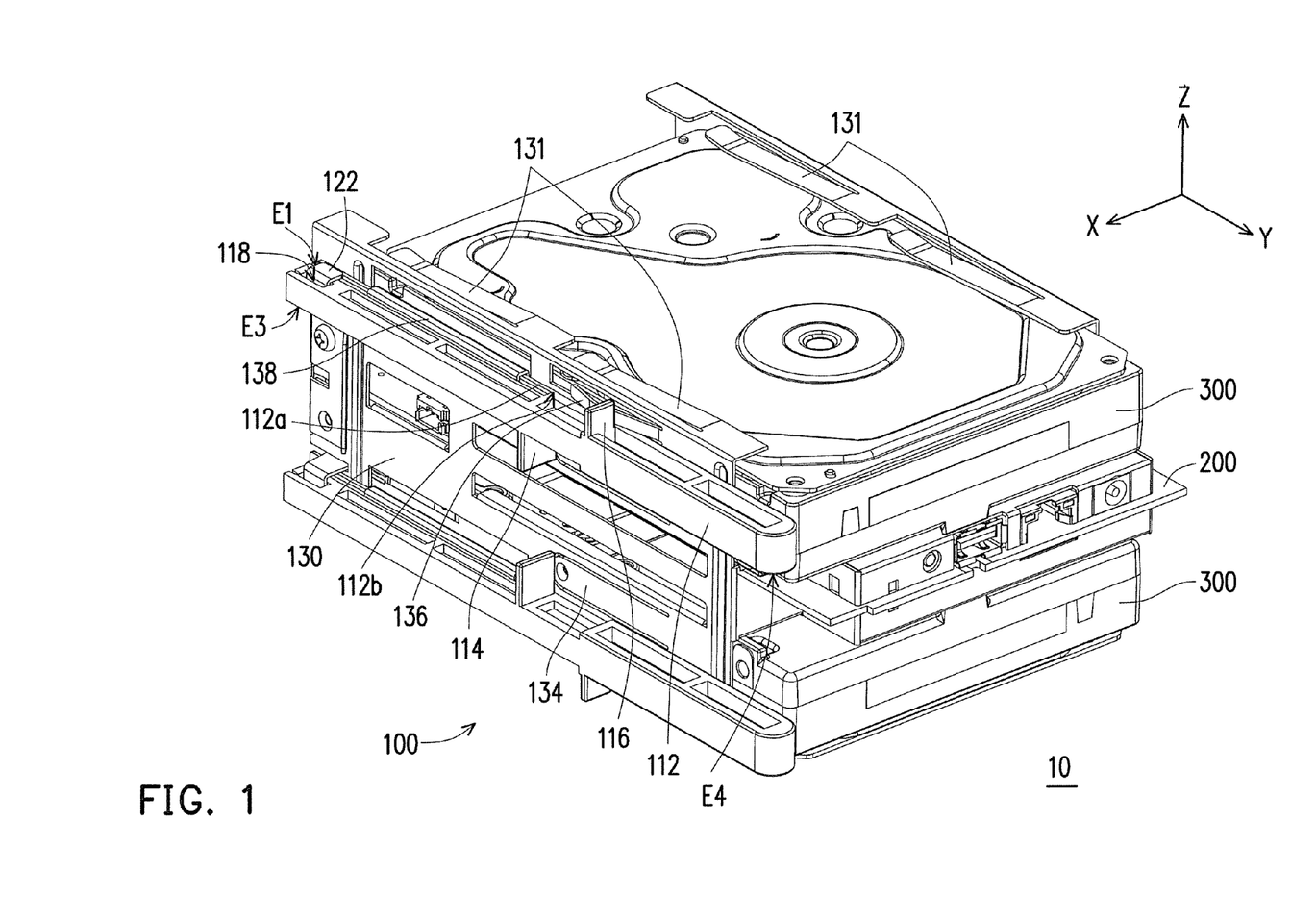
FIG. 1 is a schematic view of an electronic device according to an embodiments embodiment.
Figure 2:
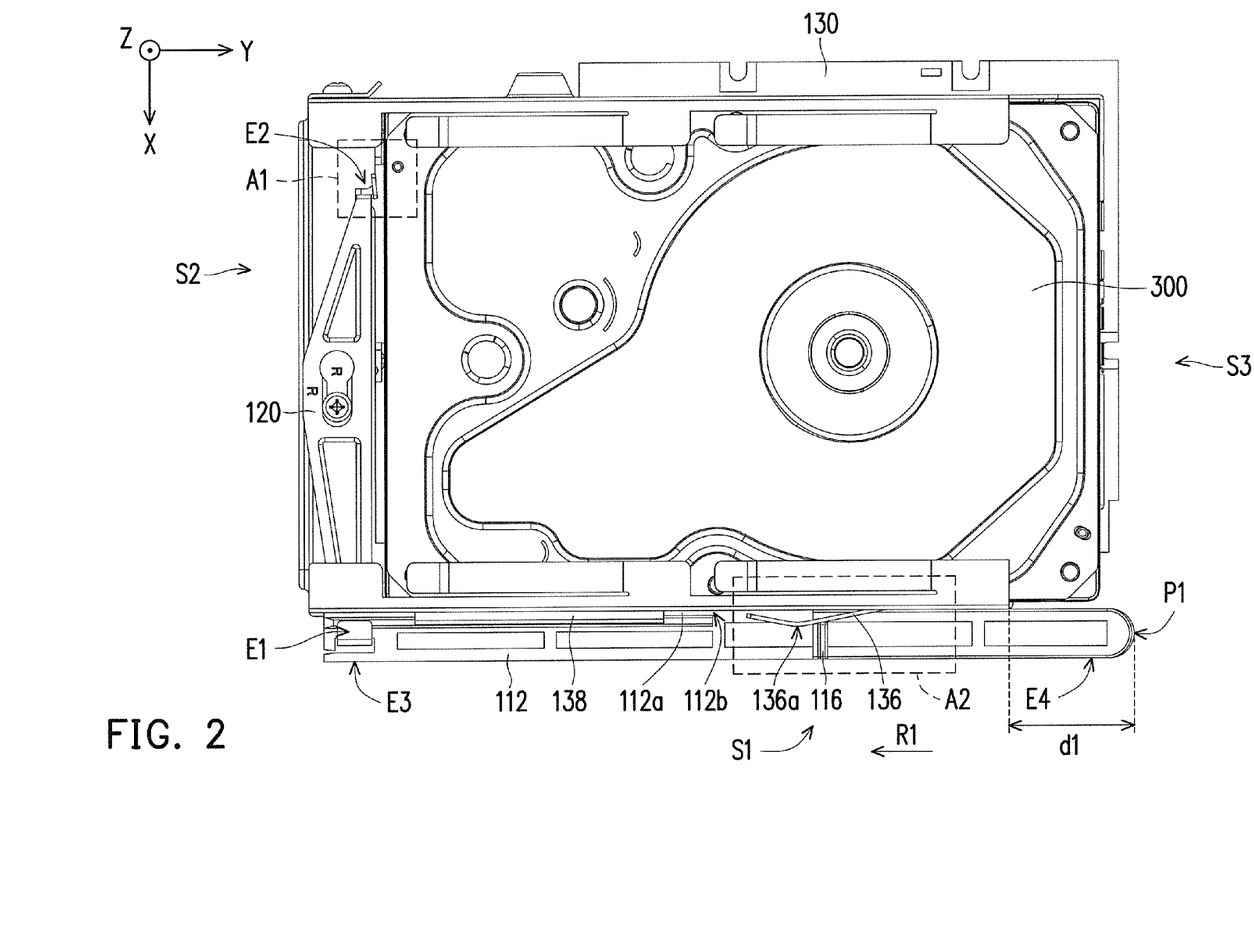
FIG. 2 is a top view of the electronic device depicted in FIG. 1.
Figure 3:
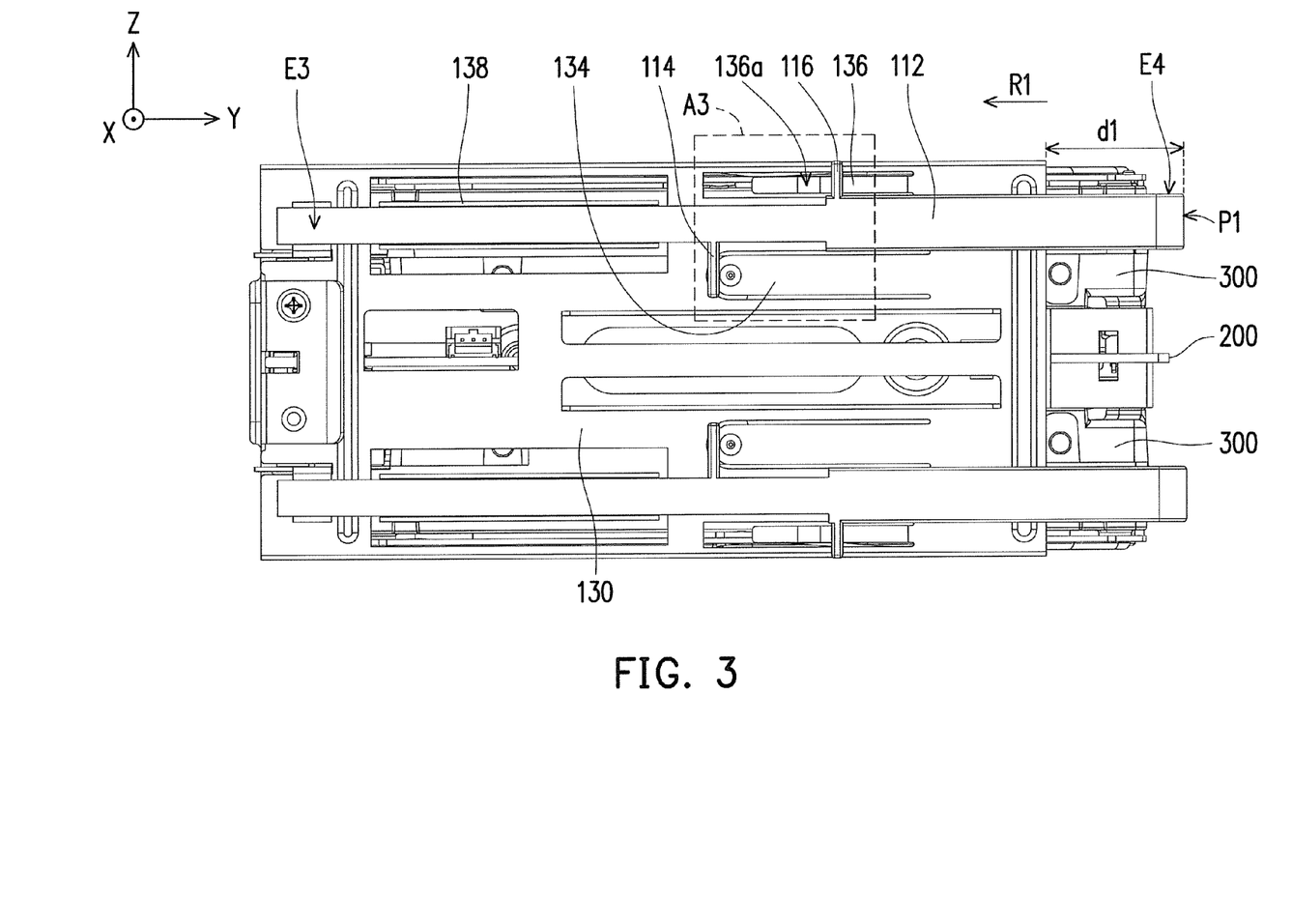
FIG. 3 is a side view of the electronic device depicted in FIG. 1.
Figure 4:
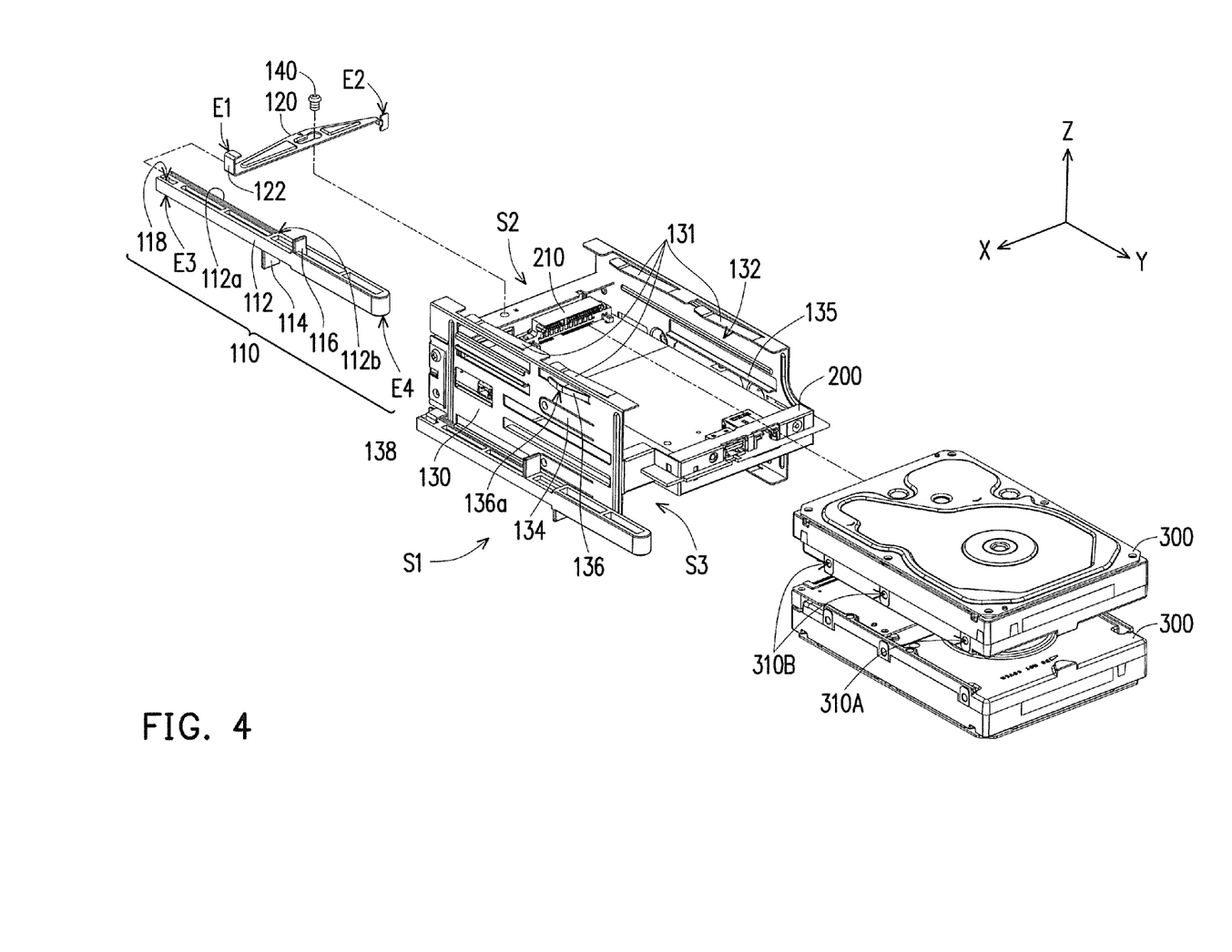
FIG. 4 and FIG. 5 are explosion diagrams of partial members of the electronic device depicted in FIG. 1.
Figure 5:
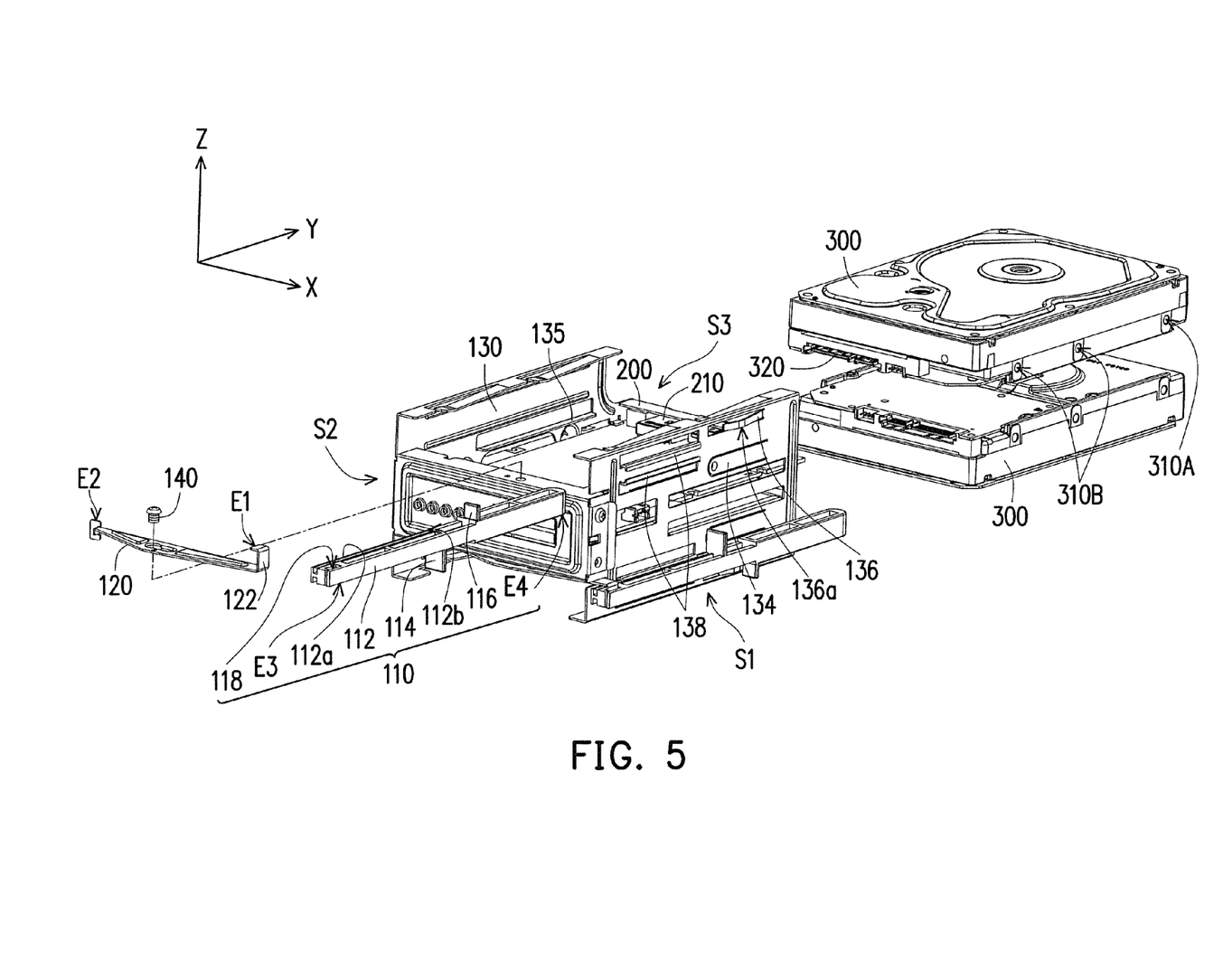

FIG. 1 is a schematic view of an electronic device according to an embodiments embodiment. FIG. 2 is a top view of the electronic device depicted in FIG. 1. FIG. 3 is a side view of the electronic device depicted in FIG. 1. FIG. 4 and FIG. 5 are explosion diagrams of partial members of the electronic device depicted in FIG. 1. Herein, related members in FIG. 4 and FIG. 5 are illustrated in different viewing angles so as facilitate in identifying said members more clearly. Referring to FIG. 1 to FIG. 5 together, a rectangular coordinate system is adopted herein so as describe relative relations between the members more clearly. In the present embodiment, an electronic device 10 is, for example, a network attached storage (NAS) in which at least one electronic unit 300 (e.g., a storage unit such as a hard disk and so on) is detachably installed. More specifically, the present embodiment is illustrated by using the electronic device 10 capable of being installed with two electronic units 300 as an example, but the exemplary embodiment is not limited thereto. In other embodiments not illustrated, the electronic device may also be a computer host having a removable hard disk or a detachable electronic unit of similar type. Nevertheless, the network attached storage is used as examples to illustrate the following embodiments.

In the present embodiment, the electronic device 10 includes a casing structure 100, a control unit 200 and the electronic units 300. Herein, the casing structure 100 includes a first linking member 110, a second linking member 120 and a frame 130, and related diagrams regarding an exterior portion of the casing structure 100 are omitted, so that corresponding relations between the related members in the casing structure 100 may be identified more clearly. The control unit 200 is disposed in a capacity space 132 of the frame 130 parallel to a X-Y plane. The control unit 200 may be, for example, a control circuit and relate linking elements of the network attached storage. For example, elements electrically connected to the electronic unit 300, elements for electrically connecting the electronic device 10 to external devices, or even related elements adopting a wireless transmission as a transmitting method, all of the above fall in the scope of the control unit 200 in the present embodiment, but the exemplary embodiment is not limited thereto.

Each of the two electronic units 300 may be moved into the capacity space 132 along a track 135 of the frame 130 in a negative Y-axis direction (or moved out the capacity space 32 in a positive Y-axis). The two electronic units 300 moved in the capacity space 132 are disposed at opposite sides of the control unit 200 corresponding to each other in a top and bottom manner along a Z-axis to be electrically connected to the control unit 200. Meanwhile, a surface of each of the electronic units 300 is pressed by an elastic piece 131 of the frame 131, so as to hold the electronic unit 300 between the track 135 and the elastic piece 131. As described above, the present embodiment includes the two electronic units 300, thus the casing structure 100 also includes two related structures corresponding to the two electronic units 300 for assembling the two electronic units 300. Hereinafter, only one of the two related structures is illustrated and described with reference numbers and text description.

Referring back to FIG. 3 to FIG. 5, in the present embodiment, the frame 130 further includes an elastic fastener 134 located at a first side S1 of the capacity space 132, and the elastic fastener 134 may be, for example, an elastic arm structure integrally formed with the frame 130 made of a metal plate by a stamping process. The first linking member 110 is slidably coupled to the first side S1 of the frame 130. The second linking member 120 is pivoted to a second side S2 of the frame 130, and the second linking member 120 has a first end E1 and a second end E2 opposite to each other. Therein, the first end E1 is linked to a third end E3 of the first linking member 110, and the second end E2 faces the electronic unit 300 located in the capacity space 132. Namely, a gap (e.g., as shown in a partial area A1 of FIG. 2) is maintained between the second end E2 and the electronic unit 300, and a fourth end E4 of the first linking member 110 is protruded outside of a third side S3 of the frame 130. Herein, the second side S2 and the third side S3 of the frame 130 are opposite to each other, and the first side S1 is adjacent between the second side S2 and the third side S3. The electronic unit 300 is adapted to be moved in or out the capacity space 132 from the third side S3, and when the electronic unit 300 is moved in the capacity space 132, a connector 320 (depicted in FIG. 5) therein is adapted to be electronically connected to a connector 210 (depicted in FIG. 4) of the control unit 200 located at the second side S2 of the frame 130.

More specifically, the frame 130 has a track 138 located at the first side S1, and a rod 112 of the first linking member 110 has a cantilever structure 112a correspondingly coupled to the track 138 to move the first linking member 110 back and forth along the Y-axis relative to the frame 130. Further, the second linking member 120 is rotatably assembled on the second side S2 of the frame 130 by using a locking member 140 to rotate back and forth on the X-Y plane with where they are locked as a center. As shown in FIG. 4, the second linking member 120 has a hook 122 located at the first end E1, and the first linking member 110 has a slot 118 located at the third end E3. By having the hook 122 movably locked on the slot 118, a linkage is formed by linking the second linking member 120 and the first linking member 110 to each other. Accordingly, a linear (one-dimensional) motion on the first linking member 110 along the Y-axis may lead to a planer (two-dimensional) motion of the second linking member 120 on the X-Y plane.

Figure 6:
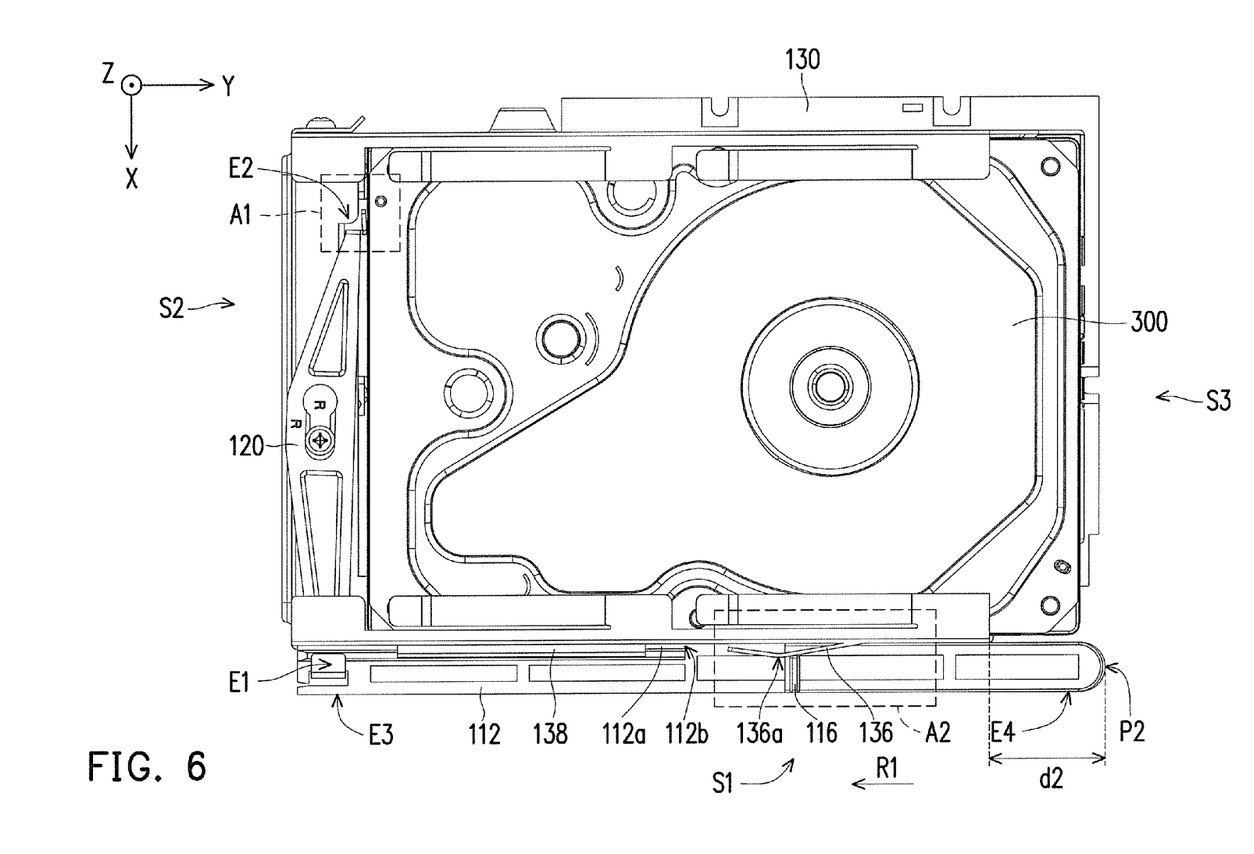
FIG. 6 to FIG. 8 are respectively top views and a side view of the electronic unit relative to the frame and the corresponding members in different conditions.
Figure 7:
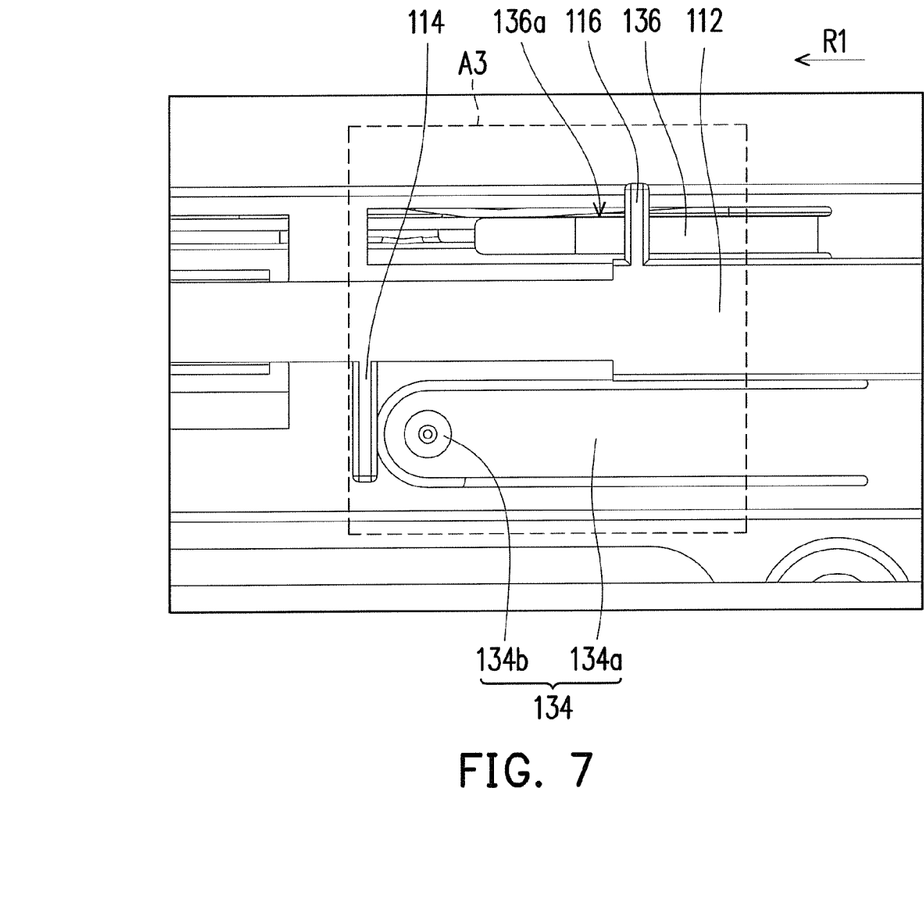
Figure 8:
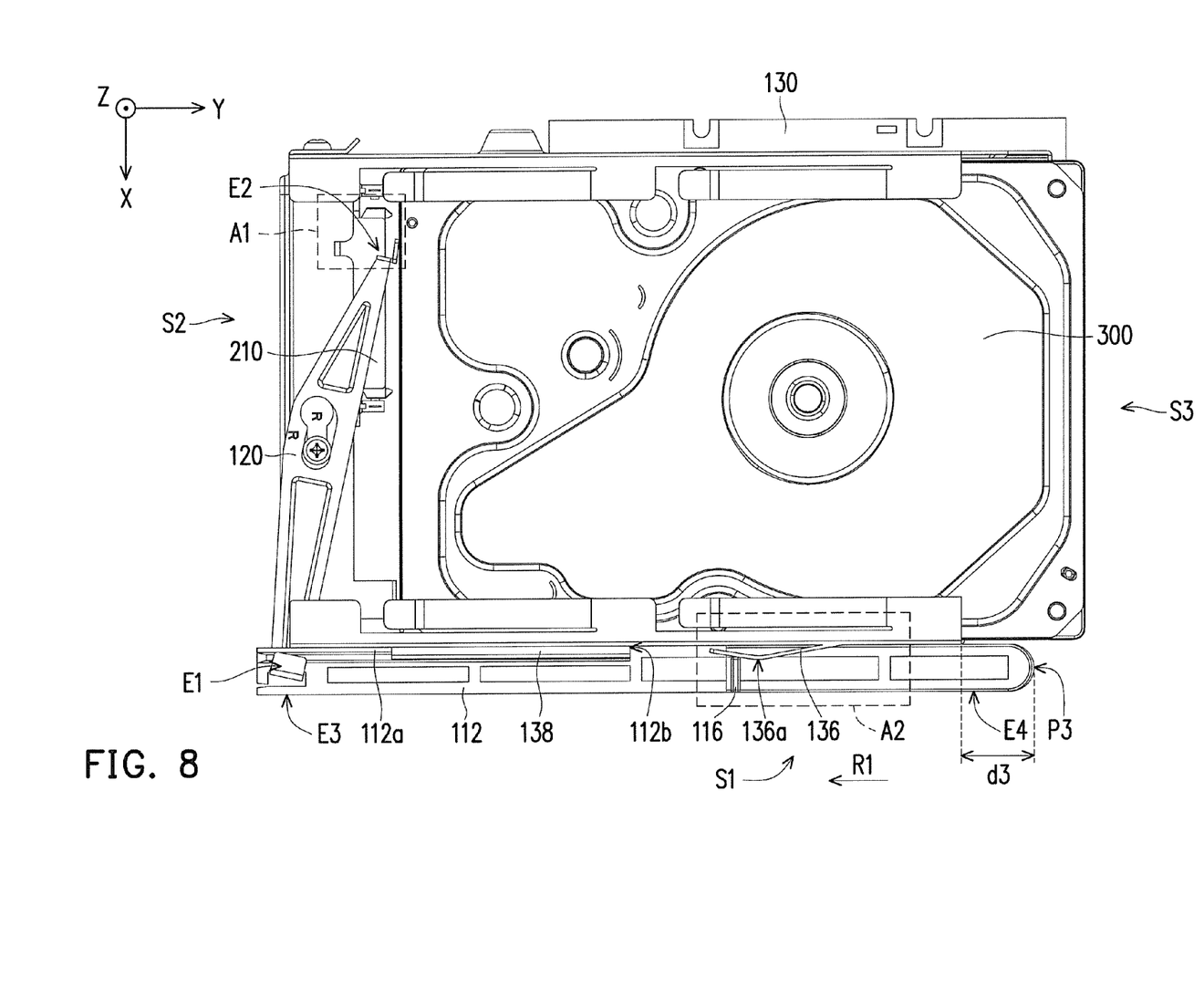
Figure 9:
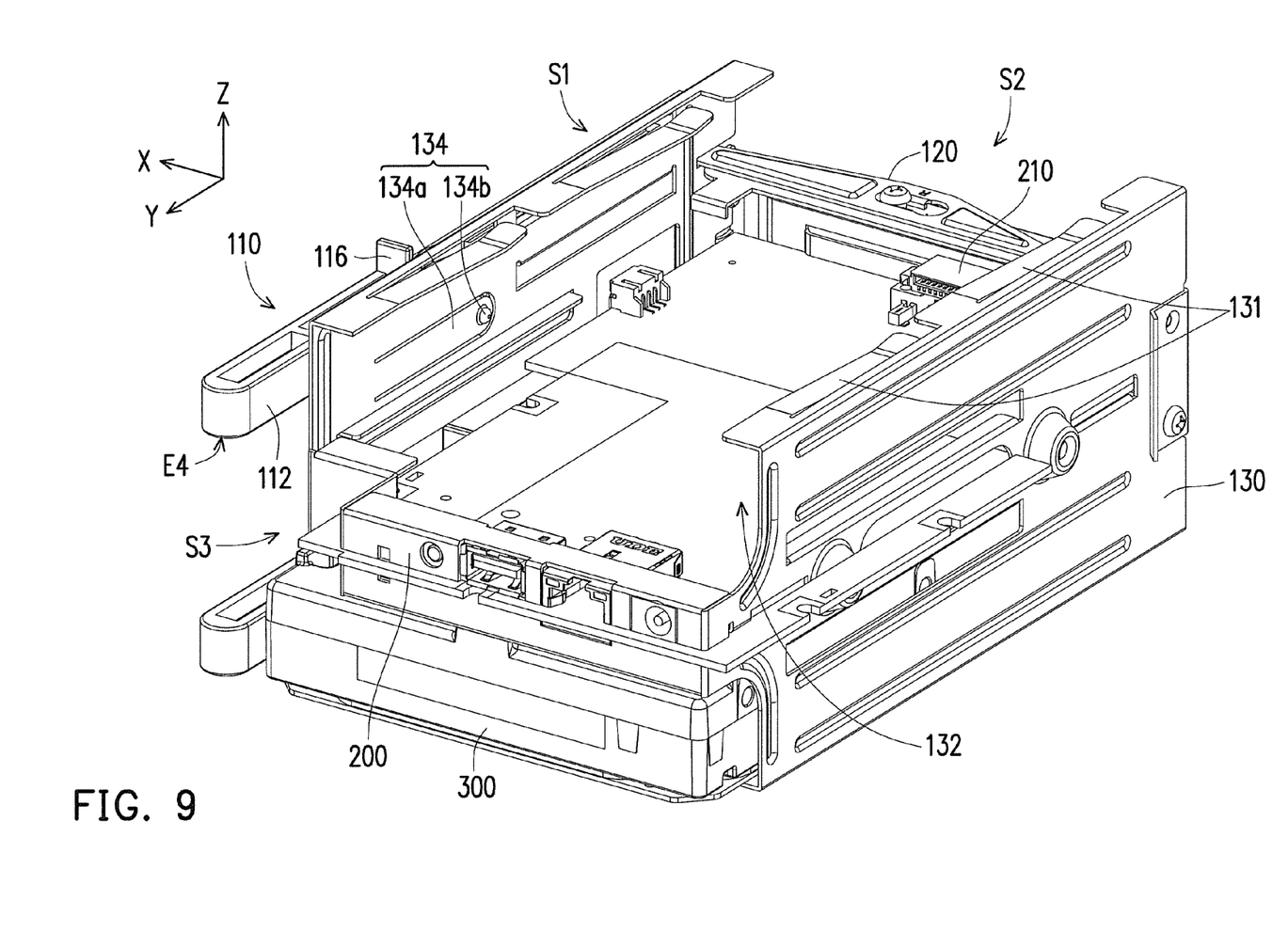
FIG. 9 is a schematic view of partial members of the electronic device depicted in FIG. 1.

FIG. 6 to FIG. 8 are respectively top views and a side view of the electronic unit relative to the frame and the corresponding members in different conditions. FIG. 9 is a schematic view of partial members of the electronic device depicted in FIG. 1. One of the electronic units is omitted in FIG. 9, so as facilitate in identifying structural feature of the frame 130 in the capacity space 132 more clearly. Referring to FIG. 2 to FIG. 4 and FIG. 9 first, when the electronic unit 300 is in an assembling mode, the electronic unit 300 is fixed to the frame 130 and electrically connected to the control unit 120, and the first linking member 110 is located at a first position P1. Herein, under restriction by the drawing, in order to emphasize differences between positions of the first linking member 110, a front edge of a lateral side of the frame 130 depicted in FIG. 2 and FIG. 3 of the present embodiment is served as a reference for defining the first linking member 110 located at the first position P1 which includes a distance d1 relative to the front edge of the lateral side of the frame 130, and related description regarding said feature will be described later.

More specifically, the elastic fastener 134 of the frame 130 has an elastic arm portion 134a and a protrusion 134b extended towards the capacity space 132 (depicted in FIG. 9), in which the elastic arm portion 134a is an extending structure of the frame 130, and the protrusion 134b is located at an end of the elastic arm portion 134a which is far away from where it extends. When the electronic unit 300 is in the assembling mode, the protrusion 134b is locked in a first locking hole 310A of the electronic unit 300 near the first side S1, while the elastic fastener 134 is prop against between the first locking hole 310A and the first linking member 110. In other words, as shown in a partial area A3 of FIG. 3, the first linking member 110 further includes a stopper 114 extended from the rod 112 along the Z-axis, and the elastic fastener 134 is located on a movement path of the stopper 114. When the first linking member 110 is located at the first position P1, the stopper 114 is located at a position where the protrusion 134b is blocked from moving out the first locking hole 310A. Namely, the stopper 114 blocks the protrusion 134b from moving towards a positive X-axis thereby restricting the protrusion 134b in the first locking hole 310A by the stopper 114, so as to accomplish an effect of fixing the electronic unit 300 by the protrusion 134b of the elastic fastener 134 of the frame 130.

Subsequently, referring to FIG. 6 and FIG. 7, in case the electronic unit 300 is to be removed from the frame 130, a user may simply apply a force on the fourth end E4 of the first linking member 110 to drive the first linking member 110 to move along a first direction R1 (i.e., the negative Y-axis in the drawing), such the first linking member 110 may be moved from the first position P1 to a second position P2. Meanwhile, the stopper 114 is moved from where depicted in FIG. 3 to where depicted in FIG. 7, namely, the stopper 114 no longer restricts the protrusion 134b in the first locking hole 310A. On the other hand, the second end E2 of the second linking member 120 is driven by the first linking member 110 to move from where depicted in FIG. 2 in said gap and contact the electronic unit 300 (as shown in a partial area A1 of FIG. 6). However, the force required for removing the electronic device 300 is not yet provided by the second linking member 120. Herein, the front edge of the lateral side of the frame 130 is also served as a reference for defining the first linking member 110 located at the second position P2 which includes a distance d2 relative to the front edge of the lateral side of the frame 130. Therein, the distance d2 is smaller than distance d1.

Next, referring to FIG. 8, as the user continues to apply the force on the first linking member 110, the first linking member 110 is moved to a third position P3 to drive the second linking member 120 to rotate continuously, such that the second end E2 is moved from where shown in the partial area A1 of FIG. 6 to where shown in a partial area A1 of FIG. 8. In this case, the electronic unit 300 is removed by the force continuously applied by the user to exit the assembling mode, namely, a connecting relation between the electronic unit 300 and the connector 210 is released in a disassembling mode. Accordingly, the electronic unit 300 in the disassembling mode may be easily removed from the capacity space 132. It should be noted that, since the cantilever structure 112a coupled to the track 138 is extended from the rod 112 along the Y-axis, when the first linking member 110 is forced to move towards the negative Y-axis, an interference is generated between a connecting portion 112b and the track 138 to block the first linking member 110 at the third position P3, so as to prevent the first linking member 110 from being released from track 138 due to the force continuously applied by the user. In other words, the connecting portion 112b provides functions of blocking and restricting the first linking member 110. Herein, the front edge of the lateral side of the frame 130 is also served as a reference for defining the first linking member 110 located at the third position P3 which includes a distance d3 relative to the front edge of the lateral side. Therein, the distance d3 is smaller than distance d2. Meanwhile, in view of the distances d1 and d2 as described above, the distance d3 is smaller than the distance d2 so as to be smaller than d1, this may be used to illustrate the three different positions P1, P2 and P3 regarding where the first linking member 110 may be located after being forced to move towards the first direction R1.

A process for converting the electronic unit 300 from the disassembling mode into the assembling mode is described below.

Referring to FIG. 4 and FIG. 5 first, in the present embodiment, the frame 130 further includes an elastic driving member 136 located at the first side S1, the first linking member 110 further includes a driver 116 extended from the rod 112 along the Z-axis, and the elastic driving member 136 is located on a movement path of the driver 116. The elastic driving member 136 is similar to the elastic fastener 134, both are integrally formed with the frame 130 by the stamping process. Unlike the elastic fastener 134, the elastic driving member 136 is further bent to form an elastic piece structure having a reverse bending portion 136a, and the reverse bending portion 136a has a recess facing towards the first linking member 110.

Next, referring to a partial area A2 of FIG. 4 and a partial area A2 of FIG. 8 together, the electronic device 300 is moved in the capacity space 132 by the user so that the electronic device 300 is in the disassembling mode in which the connector 210 is not connected. In this case, the first linking member 110 is still located at the third position P3. Thereafter, the electronic unit 300 is forced by the user to move towards the negative Y-axis, so that the electronic device 300 drives the second end E2 of the second linking member 120 to move (i.e., the second linking member 120 is rotated), thereby driving the first linking member 110 to further move to the second position P2 as shown in FIG. 6. Meanwhile, the electronic unit 300 is connected to the connector 210 of the control unit 200 as in the assembling mode. Thereafter, the user stops applying force on the first linking member 110.

It should be noted that, the driver 116 of the first linking member 110 passes the reverse bending portion 136a of the elastic driving member 136 and moves from the third position P3 to the second position P2, as shown in a partial area A2 of FIG. 6 or a partial area A3 of FIG. 7. Namely, with respect to the frame 130, the reverse bending portion 136a of the elastic driving member 136 is located between the driver 116 at the second position P2 and the driver 116 at the third position P3. However, in the first linking member 110 located at the second position P2, the elastic driving member 136 is still in a status of elastically deformed under pressing of the driver 116. Accordingly, in case the user stops applying the force, an elastic restoring force of the elastic driving member 136 further drives the driver 116 of the first linking member 110 to move towards the positive Y-axis direction, such that the first linking member 110 is driven from the second position P2 of FIG. 6 back to the first direction P1 of FIG. 2. In other words, due to an elastic action of the elastic driving member 136, it can be effectively ensured that the first linking member 110 may be restored to its original position when the electronic unit 300 is in the assembling mode, so that the user may easily apply the force next time the electronic unit 300 is to be removed.

Figure 10:
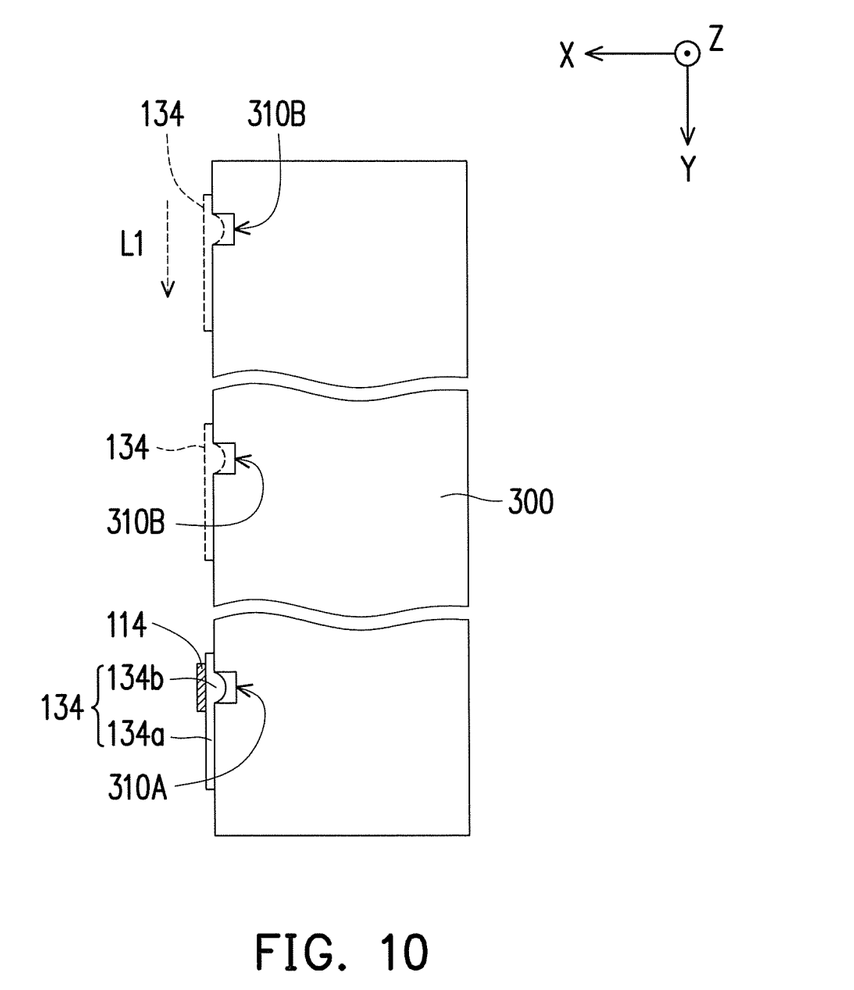
FIG. 10 is a schematic view illustrating a process for assembling the electronic unit to the frame.

On the other hand, FIG. 10 is a schematic view illustrating a process for assembling the electronic unit to the frame. Herein, a partial equivalent schematic diagram is illustrated in a top view angle of the electronic device 10 with specific elements being appropriately omitted.

Referring to FIG. 9 and FIG. 10 with reference to FIG. 4 and FIG. 5, as described above, the elastic fastener 134 includes the elastic portion 134a and the protrusion 134b. Further, the electronic unit 300 also includes the first locking hole 310A and a plurality of second locking holes 310B arranged along a movement path (i.e., along the Y-axis) of the electronic unit 300 in the capacity space 132. Herein, the locking holes 310A and 310B are locking threaded holes of the hard disk for example, which may be locked together with the frame 130 by the screws in conventional technology. Naturally, when the structure of the elastic fastener 134 and the stopper 114 of the first linking member 110 as described in the present embodiment are used together, it is not required to adopt assembling means of conventional art which is relatively more complex. Instead, an existing structure of the electronic unit 300 may be utilized as a feature for locking the electronic unit 300 in the present embodiment, such that design effort and manufacturing costs may both be significantly reduced.

It should be noted that, the electronic unit 300 is moved in the capacity space 132 relative to the frame 130 along a movement path L1. Thus, it is inevitably that the protrusion 134b is going to be locked in the second locking holes 310B in sequence. Nevertheless, the stopper 114 under said conditions is not moved with the first linking member 110 to block at a side of the protrusion 134b back to the protrusion 134b (i.e., the first linking member 110 is not moved back to the first position P1 yet). Therefore, during a movement of the electronic unit 300, due to elasticity of the elastic arm portion 134a, the protrusion 134b is substantially pseudo-locked in the second locking holes 310B, respectively. Namely, along with the movement of the electronic unit 300, the protrusion 134b may still be moved out the second locking hole 310B. Until the protrusion 134b is locked in the first locking hole 310A, the elastic fastener 134 is then prop against between the stopper 114 and the first locking hole 310A because the first linking member 110 is moved to the first position P1, thereby accomplishing the effect of fixing the electronic unit 300 to the frame 130.

Based on above, in the foregoing embodiments, a simple structural combination between the first linking member, the second linking member and the frame in the casing structure may form the linkage by connecting the first linking member with the second linking member, so as to serve as a power source and an attaching structure driven for disassembling/disassembling the electronic unit to the frame. Meanwhile, when the electronic unit is the assembling mode, the first linking member may further be used as a stopper structure for locking the elastic fastener to the electronic unit, so as to ensure that the electronic unit may be securely assembled to the frame while maintaining electrically connected to the control unit. Moreover, as the first linking member moves on the side, besides that a blocking effect to the elastic fastener may be released, the electronic unit may also be pushed away from the frame by the linkage, and electrically disconnected from the control unit, thereby accomplishing the effect of disassembling/disassembling the electronic unit easily.

In addition, by using the elastic driving member which is also disposed on the frame together with the driver of the first linking member, after the electronic unit is assembled to the frame in the assembling mode, the first linking member may be driven by the elastic action of the elastic driving member to be restored to the original position. This can ensure that the first linking member may be accurately returned, so as to accomplish the effect of easy operation for the user.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A casing structure, at least one electronic unit being adapted to be detachably assembled to the casing structure, and the casing structure comprising:
   a frame having a capacity space and an elastic fastener located at a side of the capacity space, and the electronic unit being adapted to be detachably assembled in the capacity space;
   a first linking member slidably coupled to the side of the frame; and
   a second linking member pivoted to the frame and having a first end and a second end opposite to each other, the first end linking the first linking member, the second end facing the electronic unit located in the capacity space, the electronic unit located in the capacity space being locked by the elastic fastener in an assembling mode and the first linking member being located at a first position to block the elastic fastener for preventing the elastic fastener from releasing the electronic unit thereby fixing the electronic unit to the frame, and after the first linking member being forced by a force parallel to a first direction extended from the first linking member to slide relative to the frame to move out the first position towards the first direction, the first linking member pressing the second linking member to drive the second linking member to rotate relative to the frame, such that the second end of the second linking member pushes the electronic unit to be released from the elastic fastener in a disassembling mode.

2. The casing structure of claim 1, wherein when the first linking member moves from the first position to a second position, the second end moves from a place away from the electronic unit to approach and contact the electronic unit, and when the first linking member slides from the second position to be far away from the first position, the second end pushes the electronic unit to be in the disassembling mode.

3. The casing structure of claim 1, wherein when the first linking member moves from the first position to a second position, the second end moves from a place away from the electronic unit to approach and contact the electronic unit, and when the electronic unit is converted from the disassembling mode into the assembling mode, the electronic unit pushes the second end to rotate the second linking member so the second linking member presses the first linking member to move from the second position back to the first position.

4. The casing structure of claim 1, wherein when the first linking member moves from the first position to a second position, the second end moves from a place away from the electronic unit to approach and contact the electronic unit, wherein the frame further comprises an elastic driving member located at the side, the first linking member further comprises a rod and a driver extended from the rod, the elastic driving member is located on a movement path of the driver, and when the first linking member is located at the second position, the elastic driving member pushes the driver to move the first linking member back to the first position.

5. The casing structure of claim 4, wherein the elastic driving member is an elastic piece structure being bent.

6. The casing structure of claim 1, wherein when the first linking member moves from the first position to a second position, the second end moves from a place away from the electronic unit to approach and contact the electronic unit, wherein the frame further comprises an elastic driving member located at the side and having a reverse bending portion with a recess facing towards the first linking member, and the first linking member comprises a rod and a driver extended from the rod, and when the first linking member is located at the second position, the driver is pressed on the elastic driving member so the driver is pushed by an elastic restoring force of the elastic driving member to drive the first linking member to move towards the first position.

7. The casing structure of claim 1, wherein when the first linking member moves from the first position to a second position, the second end moves from a place away from the electronic unit to approach and contact the electronic unit, wherein the frame further comprises an elastic driving member located at the side and having a reverse bending portion having a recess facing towards the first linking member, and when the electronic unit is in the disassembling mode, the first linking member is located at a third position, and the reverse bending portion is located between the second position of the first linking member and the third position of the first linking member.

8. The casing structure of claim 1, wherein the first linking member comprises a rod and a stopper extended from the rod, the elastic fastener is located on a movement path of the stopper, and when the electronic unit is in the assembling mode and the first linking member is located at the first position, the elastic fastener is prop against between the electronic unit and the stopper.

9. The casing structure of claim 8, wherein the electronic unit comprises at least one locking hole, the elastic fastener comprises a protrusion, and when the electronic unit is in the assembling mode, the protrusion is locked in the locking hole.

10. The casing structure of claim 8, wherein the electronic unit comprises a first locking hole and a plurality of second locking holes arranged along a movement path of the electronic unit in the casing structure; the elastic fastener comprises a protrusion located on the movement path of the electronic unit, wherein when the electronic unit moves along the movement path of the electronic unit to be converted from the disassembling mode into the assembling mode, the protrusion is locked in the second locking holes in sequence; when the first linking member is not moved to the first position, the protrusion is pseudo-locked in the second locking holes, respectively; and when the first linking member is moved to the first position, the protrusion is locked in the first locking hole and the stopper blocks the protrusion from moving out the first locking hole.

11. An electronic device, comprising:
   a casing structure, and the casing structure comprises:

a frame having a capacity space and an elastic fastener located at a side of the capacity space;

a first linking member slidably coupled to the side of the frame;

a second linking member pivoted to the frame and having a first end and a second end opposite to each other, the first end linking the first linking member;

a control unit disposed in the capacity space; and at least one electronic unit detachably assembled in the capacity space, and the second end facing the electronic unit located in the capacity space, wherein the electronic unit located in the capacity space is locked by the elastic fastener in an assembling mode and the first linking member is located at a first position to block the elastic fastener for preventing the elastic fastener from releasing the electronic unit thereby fixing the electronic unit to the frame and electrically connecting the electronic unit to the control unit, and after the first linking member is forced by a force parallel to a first direction extended from the first linking member to slide relative to the frame to move out the first position, the first linking member drives the second linking member to rotate relative to the frame, such that the second end of the second linking member pushes the electronic unit to be released from the elastic fastener, and electrically disconnected from the control unit in a disassembling mode.

12. The electronic device of claim 11, wherein when the first linking member moves from the first position to a second position, the second end moves from a place away from the electronic unit to approach and contact the electronic unit, and when the first linking member slides from the second position to be far away from the first position, the second end pushes the electronic unit to be in the disassembling mode.

13. The electronic device of claim 11, wherein when the first linking member moves from the first position to a second position, the second end moves from a place away from the electronic unit to approach and contact the electronic unit, and when the electronic unit is converted from the disassembling mode into the assembling mode, the electronic unit pushes the second end to rotate the second linking member so the second linking member presses the first linking member to move from the second position back to the first position.

14. The electronic device of claim 11, wherein when the first linking member moves from the first position to a second position, the second end moves from a place away from the electronic unit to approach and contact the electronic unit, wherein the frame further comprises an elastic driving member located at the side, the first linking member further comprises a rod and a driver extended from the rod, the elastic driving member is located on a movement path of the driver, and when the first linking member is located at the second position, the elastic driving member pushes the driver to move the first linking member back to the first position.

15. The electronic device of claim 14, wherein the elastic driving member is an elastic piece structure being bent.

16. The electronic device of claim 11, wherein when the first linking member moves from the first position to a second position, the second end moves from a place away from the electronic unit to approach and contact the electronic unit, wherein the frame further comprises an elastic driving member located at the side and having a reverse bending portion with a recess facing towards the first linking member, and the first linking member comprises a rod and a driver extended from the rod, and when the first linking member is located at the second position, the driver is pressed on the elastic driving member so the driver is pushed by an elastic restoring force of the elastic driving member to drive the first linking member to move towards the first position.

17. The electronic device of claim 11, wherein when the first linking member moves from the first position to a second position, the second end moves from a place away from the electronic unit to approach and contact the electronic unit, wherein the frame further comprises an elastic driving member located at the side and having a reverse bending portion with a recess facing towards the first linking member, and when the electronic unit is in the disassembling mode, the first linking member is located at a third position, and the reverse bending portion is located between the second position of the first linking member and the third position of the first linking member.

18. The electronic device of claim 11, wherein the first linking member comprises a rod and a stopper extended from the rod, the elastic fastener is located on a movement path of the stopper, and when the electronic unit is in the assembling mode and the first linking member is located at the first position, the elastic fastener is prop against between the electronic unit and the stopper.

19. The electronic device of claim 18, wherein the electronic unit comprises at least one locking hole, the elastic fastener comprises a protrusion, and when the electronic unit is in the assembling mode, the protrusion is locked in the locking hole.

20. The electronic device of claim 18, wherein the electronic unit comprises a first locking hole and a plurality of second locking holes arranged along a movement path of the electronic unit in the casing structure; the elastic fastener comprises a protrusion located on the movement path of the electronic unit, wherein when the electronic unit moves along the movement path of the electronic unit to be converted from the disassembling mode into the assembling mode, the protrusion is locked in the second locking holes in sequence; when the first linking member is not moved to the first position, the protrusion is pseudo-locked in the second locking holes, respectively; and when the first linking member is moved to the first position, the protrusion is locked in the first locking hole and the stopper blocks the protrusion from moving out the first locking hole.

* * * * *